June 7, 1960  A. C. DOCKRELL  2,939,478
TIRE DEFLATING-INFLATING DEVICE
Filed Feb. 27, 1956
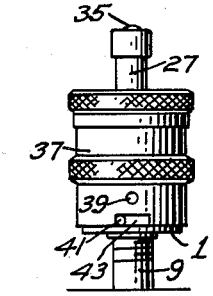
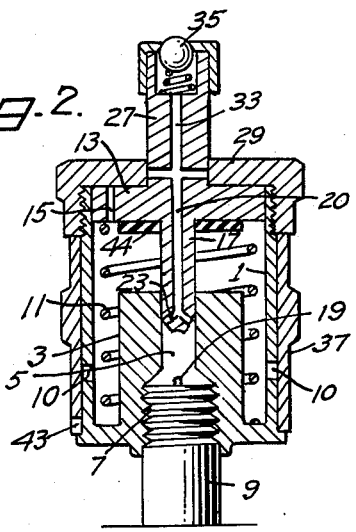
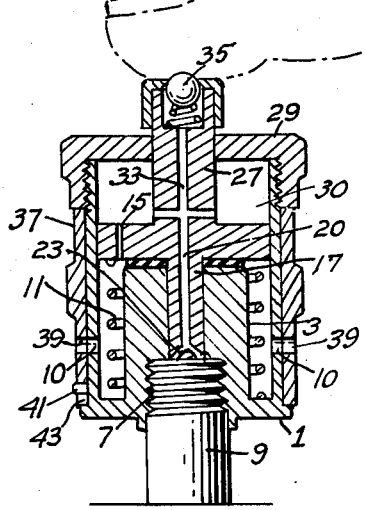
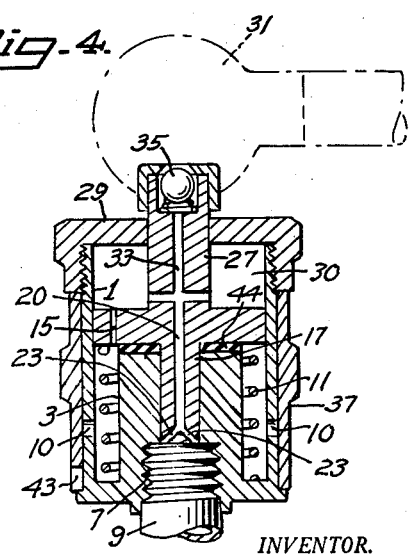
INVENTOR.
ALBERT C. DOCKRELL
BY
HIS ATTORNEYS

2,939,478
TIRE DEFLATING-INFLATING DEVICE
Albert C. Dockrell, 5228 Redondo Ave., Oakland, Calif.

Filed Feb. 27, 1956, Ser. No. 567,843

7 Claims. (Cl. 137—223)

My invention relates to pressure adjusting devices for pneumatic tires and the like, and more particularly to a tire deflating-inflating device, and is an improvement upon that of my co-pending application for Tire Deflating Device, Serial No. 368,939, filed July 20, 1953.

In various industries such as the lumber industry, the oil industry etc., trucks and trailers are employed in the hauling of exceptionally heavy loads to a destination, only to return empty. The air pressure in the tires is adjusted to the loaded condition of the truck or trailer, and accordingly, is set at a value for which tires will function with maximum of traction coupled with minimum of wear under such conditions. Such value of pressure may be on the order of 76 lbs. per square inch.

If nothing is done to alter the tire pressure after unloading, the existing tire pressures become exceedingly high for the light load conditions of the return trip, resulting in abnormal wear of the tires, to say nothing of the riding discomfort to the drivers of such vehicles. Considering the cost of such tires at around $125.00 per tire, and the fact that such vehicles run on as many as twenty tires, the maintenance of tires alone can and does run into substantial sums.

Among the objects of my invention are:

(1) To provide novel and improved means of reducing pressure in a confined space to a predetermined value, which means permits reinflation without removal;

(2) To provide novel and improved means for deflating pneumatic tires to a predetermined value, which means permits reinflation without removal;

(3) To provide novel and improved means for deflating or reinflating pneumatic tires to predetermined pressure values in a very simple and convenient manner;

(4) To provide novel and improved tire deflating and reinflating means adapted for permanent mounting on a tire valve;

(5) To provide novel and improved tire deflating and reinflating means of simple construction, requiring no precision made components except a reasonably accurate calibrated coil spring; and (6) To provide novel and improved tire deflating and reinflating means which may be manufactured at low cost.

Additional objects of my invention will be brought out in the following description of a preferred embodiment, taken in conjunction with the accompanying drawings wherein:

Figure 1 is an outside view of the assembled device in its preferred form;

Figure 2 is a view in section, longitudinally of the device, in its normal non-functioning condition;

Figure 3 is a view similar to that of Figure 2, but depicting the same during a deflating cycle; and Figure 4 is a view similar to that of Figure 2, but depicting the same during a reinflating cycle.

Referring to the drawings for the details of my invention in its preferred form, the same involves a cylinder 1, formed with one end open and having at its other end, a spring centering boss 3 extending inwardly of the cylinder, the boss having an axial passage 5 therethrough, terminating in a threaded recess 7 at the exterior end, to permit threadedly securing the cylinder onto a conventional tire valve 9.

In the wall of the cylinder, at points substantially opposite the boss, are one or more small holes 10.

Within the cylinder and encircling this centering boss 3, is a coil spring 11 whose normal axial length is longer than the boss, so as to cause the same to extend beyond the end of the boss when disposed in the cylinder. This spring is calibrated to the deflated tire pressure called for by the vehicle in its unloaded condition.

A piston 13 slidably fitting into the cylinder, normally rests against the free end of the coil spring. This piston has a leakage passage 15 of small diameter therethrough, in addition to being provided with a central valve actuating stem 17 extending therefrom in a sliding fit into the axial passage of the boss. This stem, in the non-functioning position of the piston, terminates preferably within the axial passage, so as to be normally out of engagement with the stem 19 of a tire valve on which the cylinder may be mounted.

Running longitudinally of the valve actuating stem, is a bore 20 of greater diameter than the passage 15 through the piston. This bore at the valve actuating end of the stem, terminates in one or more branch passages 23 emerging through the side of the stem, leaving the end of the stem solid for subsequent engagement with the stem 19 of the tire valve. This end is preferably concave to assure an efficient operative engagement under such conditions. In the preferred embodiment of the invention, the branch passages are symmetrically located in the stem, preferably along a diameter thereof. At its other end, the stem bore passes through the piston and connects with the space therebeyond.

Extending centrally from the other side of the piston is a control stem 27, which terminates at a point beyond the open end of the cylinder, which is subsequently closed about this stem by a closure 29 press fitted to the open end of the cylinder or otherwise affixed thereto, to provide a closed cylinder capable of forming with the piston, a chamber 30 at the upper end of the cylinder.

As thus far described, the device is capable of use in deflating a tire to a predetermined value of air pressure, determined by the calibrated value of the spring. The device is threaded onto the end of a conventional tire valve, and to bring about a deflation of the tire on which it is mounted, all one has to do is momentarily depress the control stem and then release the same. The resulting opening of the tire valve, permits of a sudden rush of air from the tire to the chamber behind the piston, where it will build up a pressure condition behind the piston comparable to the pressure in the tire. This pressure, being considerably higher than the calibrated value of the spring, will hold the tire valve open despite removal of the finger from the control stem.

In the meantime, the air in the chamber behind the piston will gradually leak through the piston passage 15 and to the atmosphere through the holes 10 in the cylinder wall, thus tending to reduce the pressure behind the piston and allowing release of more air from the tire with consequent reduction of tire pressure.

Such sequence of events continues until the pressure behind the piston has been gradually reduced to the calibration value of the spring, whereupon the slightest reduction thereafter, will enable the spring to predominate and drive the piston back to its normal position and enable the tire valve to close. Thus, it will be apparent, that the pressure remaining in any particular tire upon the closing of its valve, will very closely approach the pressure calibration of the spring.

When the vehicle is again loaded, it becomes necessary then to reinflate the tires to their original high pressure value. To permit of such reinflation, without the necessary removal of the device from the tire valve, the control stem is made to a diameter such as to receive the chuck 31 of a conventional tire inflation hose nozzle, and is further provided with a longitudinal passage 33 connecting with the steam bore; and in this longitudinal passage, I provide a check valve 35 preferably of the ball check type, permitting of the flow of air into the device while precluding the escape of air therefrom through such passage.

In conjunction with such valved control stem, a collar 37 is slidably fitted about the cylinder, such collar being provided with one or more holes 38 to match the holes in the wall of the cylinder. By rotating this collar, the holes therein can be shifted into or out of alignment with the holes in the cylinder. To enable such shifting of the collar without the necessary exercise of care or caution, an outwardly extending stop pin 41 is set into the cylinder wall, while the collar is provided with a slot 43 enclosing such pin, whereby movement of the collar is limited to the length of such slot. The location of the stop pin is such that at one end of the permissible movement of the collar, the holes will be in alignment. Thereafter, movement of the collar to its other extreme position will throw the holes out of alignment, whereby the collar will serve to seal off the holes in the wall of the cylinder.

With the cylinder wall holes thus sealed off, air is precluded from escaping from the interior of the device. Thus a flow channel to the tire valve is provided which is exclusive of the chamber 30. Under these conditions, the application of an air hose nozzle to the end of the control stem, under sufficient manual pressure to open the tire valve, will cause air to flow through the device into the tire tube to reinflate the same. Any slight leakage of air from the device during this procedure, due to lack of precision fitting of parts, will not render the device inoperative, but merely extend slightly the time period necessary to bring the tire pressure back to its original value. The component parts of the device therefore need not be made to any high degree of accuracy, except for the spring, which should be calibrated with a reasonable degree of accuracy to the deflated pressure which one wants to have in the tires, following unloading of the vehicle. If such pressure is not critical, then even the calibration of the spring need not be too critical.

A more effective functioning of the device may be realized by the application of a sealing washer 44 about the stem 17 in contact with the piston 13. This is so because its presence eliminates possible escape of air past this point during an inflation cycle should the sealing of the holes 10 not be complete. Such air escape would merely tend to prolong the inflation cycle slightly, but would not render the device inoperative.

From the foregoing description of my invention in its preferred form, it will be apparent that the same is subject to alteration and modification without departing from the underlying principles involved. As one possibility, the piston could be replaced by a flexible diaphragm. I accordingly do not desire to be limited in my protection to those specific details illustrated and described, except as they be necessitated by the appended claims.

I claim:

1. A deflator-inflator device comprising a cylinder having means therein for forming a chamber in said cylinder, means for attaching said cylinder at one end to a tire valve or the like having a depressible valve stem, means adapted, upon attachment of said cylinder to such tire valve, for manually depressing such valve stem and providing a flow connection between such valve and said chamber, means permitting leakage of air from said chamber, said means having an air flow resistance greater than said flow connection, calibrated means responsive to reduction in pressure of air in said chamber to a value just below the calibration value of said calibrated means for withdrawing said valve stem depressing means from its depressing position, and means providing an air flow passage through said deflator-inflator device to said attaching means.

2. A deflator-inflator device comprising a cylinder having means therein for forming a chamber in said cylinder, means for attaching said cylinder at one end to a tire valve or the like having a depressible valve stem, means adapted, upon attachment of said cylinder to such tire valve, for manually depressing such valve stem and providing a flow connection between such valve and said chamber, means permitting leakage of air from said chamber, said means having air flow resistance greater than said flow connection, calibrated means responsive to reduction in pressure of air in said chamber to a value just below the calibration value of said calibrated means for withdrawing said valve stem depressing means from its depressing position, and means providing an air flow passage through said deflator-inflator device to said attaching means and exclusive of said chamber.

3. A deflator-inflator device comprising a closed cylinder having at least one hole in a wall thereof and an axial passage through an end, said axial passage including a threaded recess at the exterior end to permit of threadedly securing said cylinder on a conventional tire valve or the like, a spring disposed in said cylinder, a piston slidably fitting in said cylinder and normally resting against said spring, means permitting leakage past said piston, and a valve actuating stem extending centrally from said piston into said axial passage and normally terminating adjacent said threaded recess, said stem having a longitudinal bore of greater cross-sectional area than said leakage means, said bore being exposed at one end between said piston and the other end of said cylinder, and at its other end to said threaded recess, a control stem extending from the far side of said piston to a point beyond said other end of the cylinder, said control stem having a longitudinal passage therethrough connecting with said stem bore, a valve in the flow path formed by said bore and connecting passage, and means for arbitrarily sealing said cylinder wall hole.

4. A deflator-inflator device comprising a closed cylinder having at least one hole in a wall thereof and an axial passage through an end, said axial passage including a threaded recess at the exterior end to permit of threadedly securing said cylinder on a conventional tire valve or the like, a coil spring disposed in said cylinder, a piston slidably fitting in said cylinder and normally resting against said spring, means permitting leakage past said piston, and a valve actuating stem extending centrally from said piston into said axial passage and normally terminating adjacent said threaded recess, said stem having a longitudinal bore of greater cross-sectional area than said leakage means, said bore being exposed at one end between said piston and the other end of said cylinder, and at its other end to said threaded recess, a control stem extending from the far side of said piston to a point beyond said other end of the cylinder, said control stem having a longitudinal passage therethrough connecting with said stem bore, a valve in said control stem passage, and means for arbitrarily sealing said cylinder wall hole, said last means being in the form of a collar slidably fitting about said cylinder and having a hole alignable with said cylinder wall hole in one position of said collar but shiftable out of alignment to effect sealing of said cylinder wall hole.

5. A deflator-inflator device comprising a closed cylinder having a spring centering boss extending inwardly at one end and at least one hole in a wall of said cylinder, said boss having an axial passage therethrough including a threaded recess at the exterior end to permit of threadedly securing said cylinder on a conventional tire valve or the like, a coil spring disposed in said cylinder about said boss and extending beyond the end thereof, a piston slidably fitting in said cylinder and normally resting against said spring, said piston having a leak passage thereby and a valve actuating stem extending centrally therefrom into said axial passage and having a longitudinal bore of greater cross-sectional area than said leak passage, said bore being exposed at one end between said piston and the end of said cylinder opposite said boss, and at its other end to said threaded recess, a control stem extending from the far side of said piston to a point beyond that end of the cylinder opposite said boss, and means for admitting air through said control stem to the bore of the actuating stem.

6. A deflector-inflator device comprising a closed cylinder having a spring centering boss extending inwardly at one end and at least one hole in a wall of said cylinder, said boss having an axial passage therethrough including a threaded recess at the exterior end to permit of threadedly securing said cylinder on a conventional tire valve or the like, a coil spring disposed in said cylinder about said boss and extending beyond the end thereof, a piston slidably fitting in said cylinder and normally resting against said spring, said piston having a leak passage thereby and a valve actuating stem extending centrally therefrom into said axial passage and normally terminating therein adjacent said threaded recess, said stem having a longitudinal bore of greater cross-sectional area than said leak passage, said bore being exposed at one end between said piston and the end of said cylinder opposite said boss, and at its other end to said threaded recess, a control stem extending from the far side of said piston to a point beyond that end of the cylinder opposite said boss, and means for admitting air through said control stem to the bore of the actuating stem.

7. A deflector-inflator device comprising a cylinder having a spring centering boss extending inwardly at one end and at least one hole in the wall of said cylinder, said boss having an axial passage therethrough including a threaded recess at the exterior end to permit of threadedly securing said cylinder on a conventional tire valve or the like, a coil spring disposed in said cylinder about said boss and extending beyond the end thereof, a piston slidably fitting in said cylinder and normally resting against said spring, said piston having a leak passage therethrough and a valve actuating stem extending centrally therefrom into said axial passage and normally terminating in a concave end adjacent said threaded recess, said stem being of a diameter to provide a sliding fit in said passage and having a longitudinal bore of greater diameter than said leak passage, said bore emerging at one end at a point between said piston and the end of said cylinder opposite said boss, and at its other end connecting to a pair of externally exposed diametrically located branch passages, a control stem extending from the far side of said piston to a point beyond that end of the cylinder opposite said boss, and means for admitting air through said control stem to the bore of the actuating stem, a check valve in said control stem passage, and means for arbitrarily sealing said cylinder wall hole, said last means being in the form of a collar slidably fitting about said cylinder and having a hole alignable with said cylinder wall hole in one position of said collar but shiftable out of alignment to effect sealing of said cylinder wall hole.

References Cited in the file of this patent
UNITED STATES PATENTS

| | | |
|---|---|---|
| 2,489,397 | Brummer | Nov. 29, 1949 |
| 2,685,906 | Williams | Aug. 10, 1954 |